US011827490B2

(12) United States Patent
Thomas et al.

(10) Patent No.: US 11,827,490 B2
(45) Date of Patent: Nov. 28, 2023

(54) PLENUM RATED CORD REEL ASSEMBLIES

(71) Applicant: Hubbell Incorporated, Shelton, CT (US)

(72) Inventors: Benny Thomas, Williston Park, NY (US); Roy Itzler, Orange, CT (US); Marjana Marovic Abby, Carolina, RI (US)

(73) Assignee: Hubbell Incorporated, Shelton, CT (US)

(*) Notice: Subject to any disclaimer, the term of this patent is extended or adjusted under 35 U.S.C. 154(b) by 71 days.

(21) Appl. No.: 17/077,091

(22) Filed: Oct. 22, 2020

(65) Prior Publication Data
US 2021/0171314 A1     Jun. 10, 2021

Related U.S. Application Data

(60) Provisional application No. 62/930,840, filed on Nov. 5, 2019, provisional application No. 62/927,149, filed on Oct. 29, 2019.

(51) Int. Cl.
*B65H 75/14* (2006.01)
*B65H 75/44* (2006.01)

(52) U.S. Cl.
CPC ....... *B65H 75/4471* (2013.01); *B65H 75/446* (2013.01)

(58) Field of Classification Search
CPC .. B65H 75/14; B65H 75/446; B65H 75/4471; H02G 3/088; H02G 3/381; H02G 3/383; H02G 11/02
See application file for complete search history.

(56) References Cited

U.S. PATENT DOCUMENTS

| 6,035,983 | A | * | 3/2000 | Benner | B65H 75/38 191/12.4 |
|---|---|---|---|---|---|
| 7,309,834 | B1 | * | 12/2007 | Byrd | H02G 11/02 174/53 |
| 8,739,997 | B1 | | 6/2014 | Ploof | |
| 9,423,584 | B2 | * | 8/2016 | Coan | G02B 6/4457 |
| 2017/0267114 | A1 | * | 9/2017 | Bianco | H02J 7/0027 |
| 2017/0294768 | A1 | | 10/2017 | Thomas | |
| 2019/0079257 | A1 | * | 3/2019 | Daoust | B65H 49/322 |

* cited by examiner

*Primary Examiner* — Sang K Kim
(74) *Attorney, Agent, or Firm* — Ruggiero, McAllister & McMahon LLC

(57) ABSTRACT

A cord reel assembly is provided that includes a plenum-rated enclosure with a cord reel secured in the enclosure where the enclosure forms an air tight seal from a plenum space, but is open to a finished space. Thus, a cord reel assembly is provided that includes a cord reel and a plenum rated enclosure. The cord reel has a base plate. The enclosure is open at a bottom edge. The base plate is secured in the enclosure.

24 Claims, 17 Drawing Sheets

PLENUM RATED CORD REEL ASSEMBLIES

CROSS REFERENCE TO RELATED APPLICATIONS

This application claims the benefit of U.S. Application 62/927,149 filed Nov. 6, 2019 and of U.S. Application 62/930,840 filed Nov. 14, 2019, the entire contents of both of which are incorporated herein by reference.

BACKGROUND

1. Field of the Invention

The present disclosure is related to cord reel assemblies. More particularly, the present disclosure is related to cord reel assemblies that are plenum rated.

2. Description of Related Art

In many buildings, the space between a drop or finished ceiling and the standard or unfinished ceiling is an open space that is used for air circulation and, thus, forms part of a plenum space of the HVAC system.

Similarly, some buildings define a plenum space between a finished and an unfinished floor and/or between a finished wall and an unfinished wall.

In addition, the plenum space can be "accidental" in that a leaky HVAC component caused for example, by empty screw holes, slipped joints, misaligned vents, and other causes can result in any open space becoming a plenum space.

While plenum spaces are important for air circulation, these spaces can be problematic in the event of a fire. Therefore, the installation of electrical equipment, wiring, and other items in the plenum space is subject to various fire/electrical code and regulations.

One approach to comply with these codes and regulations is to install the electric equipment outside of the plenum space. However, this approach results in the equipment occupying valuable finished space in the building and can be unsightly.

Accordingly, it has been determined by the present disclosure that there is a need for cord reel assemblies that allow for installation in the plenum space and out of the finished space.

SUMMARY

The present application provides a cord reel assembly that includes a "plenum-rated" enclosure and a cord reel secured in the enclosure. The enclosure forms an air tight seal from a plenum space, but is open to a finished space.

A cord reel assembly is provided that includes a cord reel and a plenum rated enclosure. The cord reel has a base plate. The enclosure is open at a bottom edge. The base plate is secured in the enclosure.

In some embodiments either alone or together with any one or more of the aforementioned and/or after-mentioned embodiments, the assembly further includes a cord wound on the cord reel.

In some embodiments either alone or together with any one or more of the aforementioned and/or after-mentioned embodiments, the base plate is secured in the enclosure so that the cord of the cord reel extends through the bottom edge.

In some embodiments either alone or together with any one or more of the aforementioned and/or after-mentioned embodiments, the assembly further includes a door at the bottom edge to selectively close the enclosure.

In some embodiments either alone or together with any one or more of the aforementioned and/or after-mentioned embodiments, the assembly further includes a cord wound on the cord reel.

In some embodiments either alone or together with any one or more of the aforementioned and/or after-mentioned embodiments, the cord is selected from a group consisting of an electrical extension cable, a computer network communication cable, a compressed air hose, and a fluid hose.

In some embodiments either alone or together with any one or more of the aforementioned and/or after-mentioned embodiments, the door has an opening defined therethrough. The cord reel is secured in the enclosure so that the cord extends through the opening when the door closes the enclosure.

In some embodiments either alone or together with any one or more of the aforementioned and/or after-mentioned embodiments, the opening further includes a low friction surface.

In some embodiments either alone or together with any one or more of the aforementioned and/or after-mentioned embodiments, the cord reel further includes a low friction surface at the opening.

In some embodiments either alone or together with any one or more of the aforementioned and/or after-mentioned embodiments, the low friction surface is one or more rollers.

In some embodiments either alone or together with any one or more of the aforementioned and/or after-mentioned embodiments, the enclosure further includes a supply device secured therein.

In some embodiments either alone or together with any one or more of the aforementioned and/or after-mentioned embodiments, the supply device is a junction box.

In some embodiments either alone or together with any one or more of the aforementioned and/or after-mentioned embodiments, the enclosure further includes one or more supports depending therefrom. The one or more supports are configured for securement of the enclosure to a support surface.

In some embodiments either alone or together with any one or more of the aforementioned and/or after-mentioned embodiments, the assembly further includes one or more brackets securing the cord reel to a wall of the enclosure.

In some embodiments either alone or together with any one or more of the aforementioned and/or after-mentioned embodiments, the one or more brackets provide a primary connection and a secondary connection for securing the cord reel to the wall.

In some embodiments either alone or together with any one or more of the aforementioned and/or after-mentioned embodiments, the primary connection includes one or more first bolts depending from the wall. The first bolts pass through the base plate to form a direct bolted connection between the wall and the cord reel through the one or more brackets.

In some embodiments either alone or together with any one or more of the aforementioned and/or after-mentioned embodiments, the secondary connection comprises one or more second bolts depending from the wall. The second bolts secure the one or more brackets to the enclosure with the one or more brackets supporting the base plate to form an indirect bolted connection between the wall and the cord reel via the one or more brackets.

A cord reel assembly is also provided that includes a cord reel, a cord, a plenum rated enclosure, a door, and one or more brackets. The cord reel has a base plate. The cord is wound on the cord reel. The plenum rated enclosure is open at a bottom edge and the door is at the bottom edge to selectively open and close the enclosure. The door has an opening defined therethrough. The brackets secure the base plate of the cord reel to a wall of the enclosure so that the cord reel is housed in the enclosure with the cord extending through the opening when the door closes the enclosure.

In some embodiments either alone or together with any one or more of the aforementioned and/or after-mentioned embodiments, the one or more brackets provide a primary connection and a secondary connection for securing the cord reel to the wall. The primary connection includes first bolts depending from the wall. The first bolts pass through the base plate to form a direct bolted connection between the wall and the cord reel through the one or more brackets. The secondary connection includes second bolts depending from the wall. The second bolts secure the one or more brackets to the enclosure with the one or more brackets supporting the base plate to form an indirect bolted connection between the wall and the cord reel via the one or more brackets.

The above-described and other features and advantages of the present disclosure will be appreciated and understood by those skilled in the art from the following detailed description, drawings, and appended claims.

DETAILED DESCRIPTION

Figure 1:
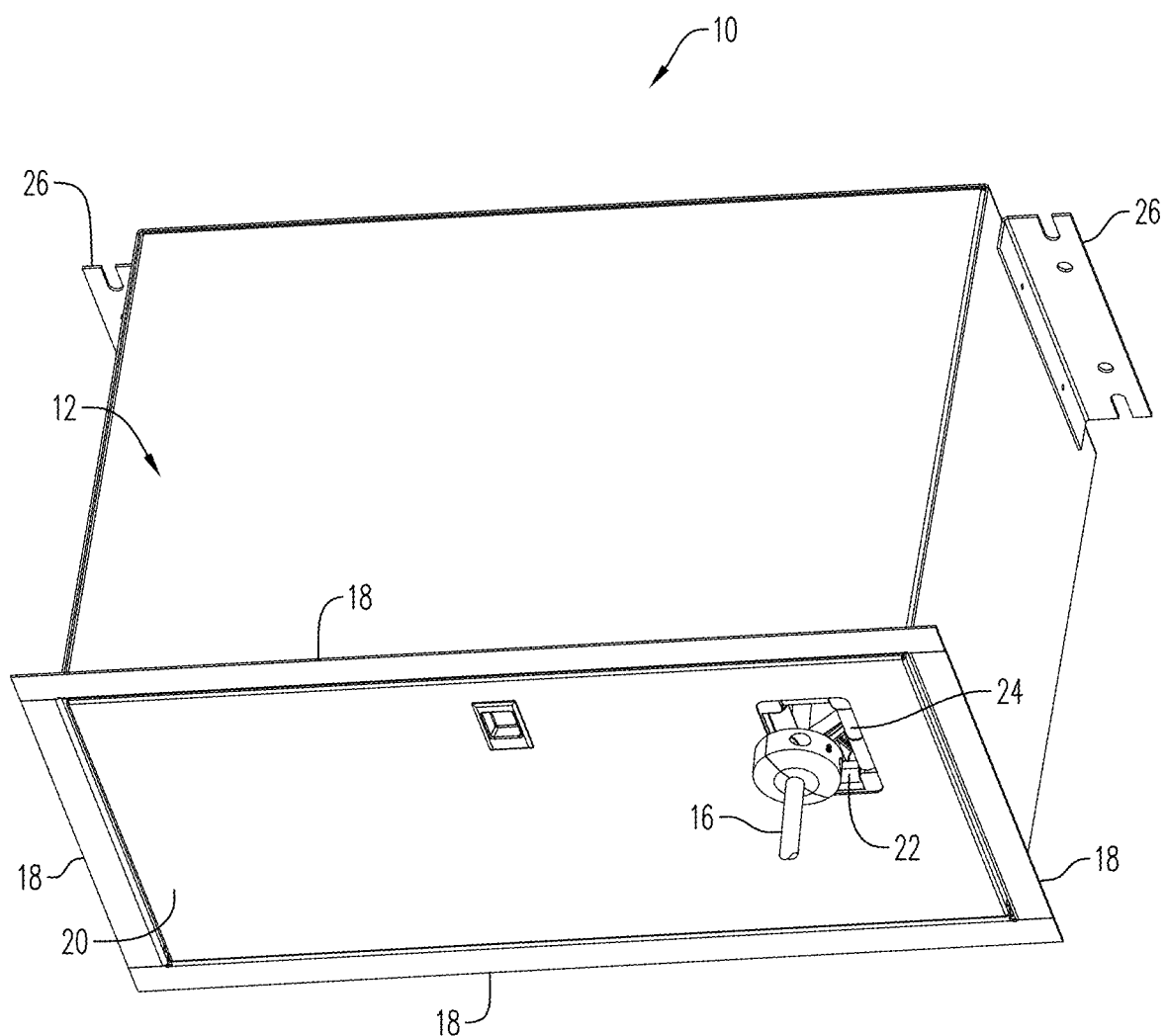
FIG. 1 is a perspective view of a plenum rated cord reel assembly according to the present disclosure.
Figure 2:
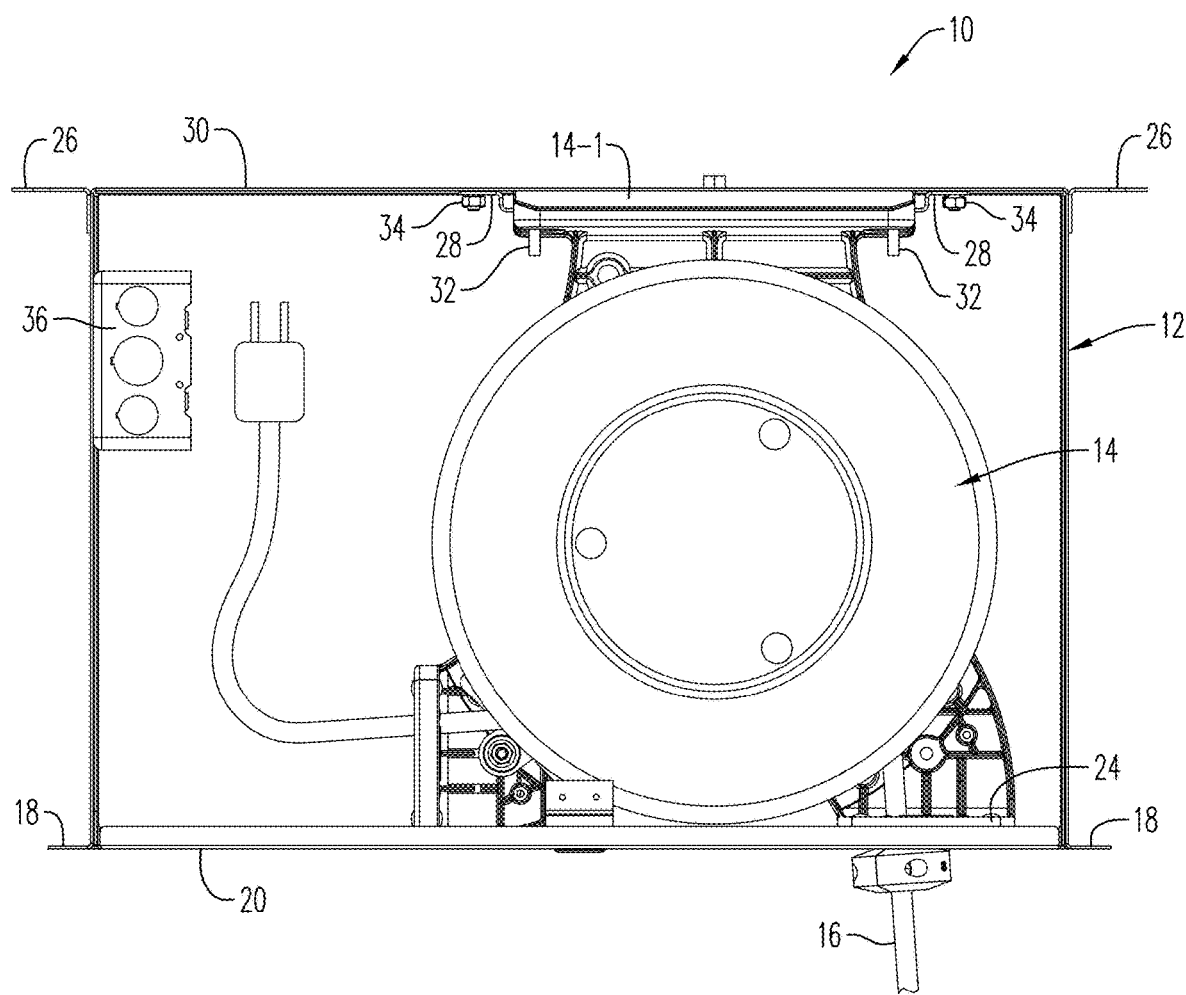
FIG. 2 illustrates the assembly of FIG. 1 with a portion of the enclosure cut away to reveal an inner region.
Figure 3:
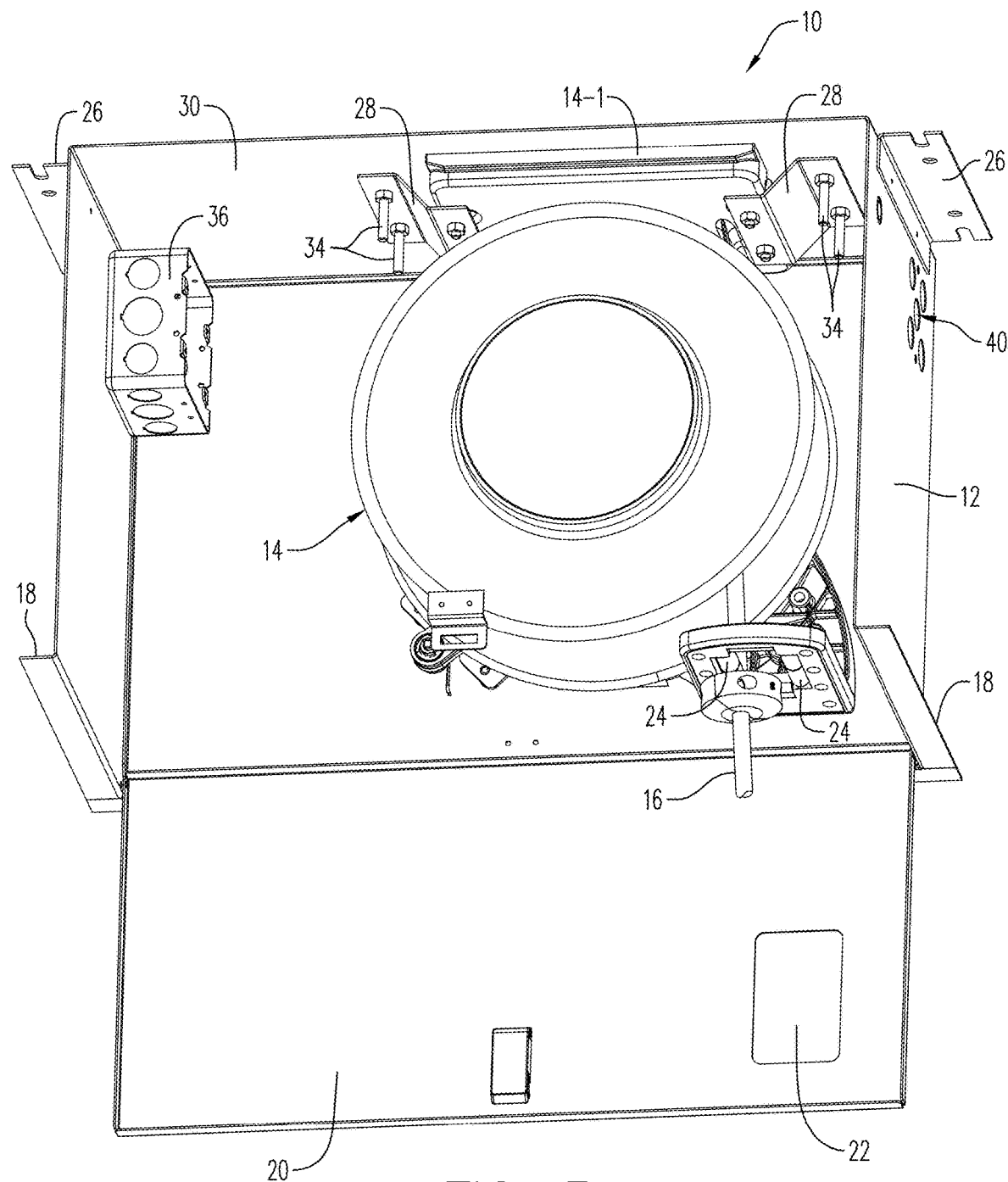
FIG. 3 illustrates the assembly of FIG. 2 with a door in an open position.

Referring to the drawings and in particular with simultaneous reference to FIGS. 1-3, an exemplary embodiment of a cord reel assembly according to the present disclosure is shown and is generally referred to by reference numeral 10.

Assembly 10 includes an enclosure 12 housing a cord reel 14. Reel 14 is configured to store lengths of flexible material (hereinafter referred to as "cords") such as, but not limited to electrical extension cables, computer network communication cables, compressed air hoses, fluid hoses, and others wound on the reel.

Advantageously, enclosure 12 is a plenum rated enclosure configured to enable mounting of cord reel 14 in a space above a drop or finished ceiling. As used herein, the term "plenum-rated" shall mean that enclosure seals the area within the enclosure from the exterior of the enclosure in an airtight manner and/or conforms to UL Standard 2043 entitled "Fire Test for Heat and Visible Smoke Release for Discrete Products and Their Accessories Installed in Air-Handling Spaces".

Simply stated, enclosure 12 isolates the plenum space from the finished space in a manner that provides an interior that houses cord reel 14 without requiring cord 16 on the reel to be formed of plenum rated materials and/or in a manner that meets applicable codes for electrical equipment in plenum spaces.

Enclosure 12 includes a bottom edge 18 that is positioned in or at the level of the finished space so that an exterior of the enclosure is within the plenum space and an interior of the enclosure is open to (i.e., in fluid communication with) the finished space.

In some embodiments, enclosure 12 is open at bottom edge and includes a door or cover 20. In some embodiments, door 20 is removable from the enclosure or is hinged to enclosure so that the enclosure can be opened with respect to the finished space or closed off from the finished space. Door 20, when open/removed, allows access to reel 14, cord 16, and any other components within enclosure 12. Additionally, door 20, when closed, can hide or otherwise conceal reel 14, cord 16, and any other components within enclosure 12 from the finished space.

Door 20 can, in other embodiments, include an opening 22 positioned and configured to cooperate with reel 14 so that cord 16 protrudes or is at least accessible through the door.

It is contemplated by the present disclosure for opening 22 to be sized to prevent cord 16 from being cut or damaged by friction when extending and retracting from assembly 10.

It is also contemplated by the present disclosure for reel 14 can include a low friction surface 24 that prevents cord 16 from being cut or damaged by friction when extending and retracting from the reel and door 20. Surface 24 can be any low friction surface such as rounded edges, coated edges, rollers, and others. In some embodiments, assembly 10 is configured so that when door 20 is closed, surface 24 protrudes into or through opening 22.

In this manner, the construction of enclosure 12 is simplified by taking advantage of surface 24 on reel 12 to protect cord 16 from opening 16.

Figure 13:
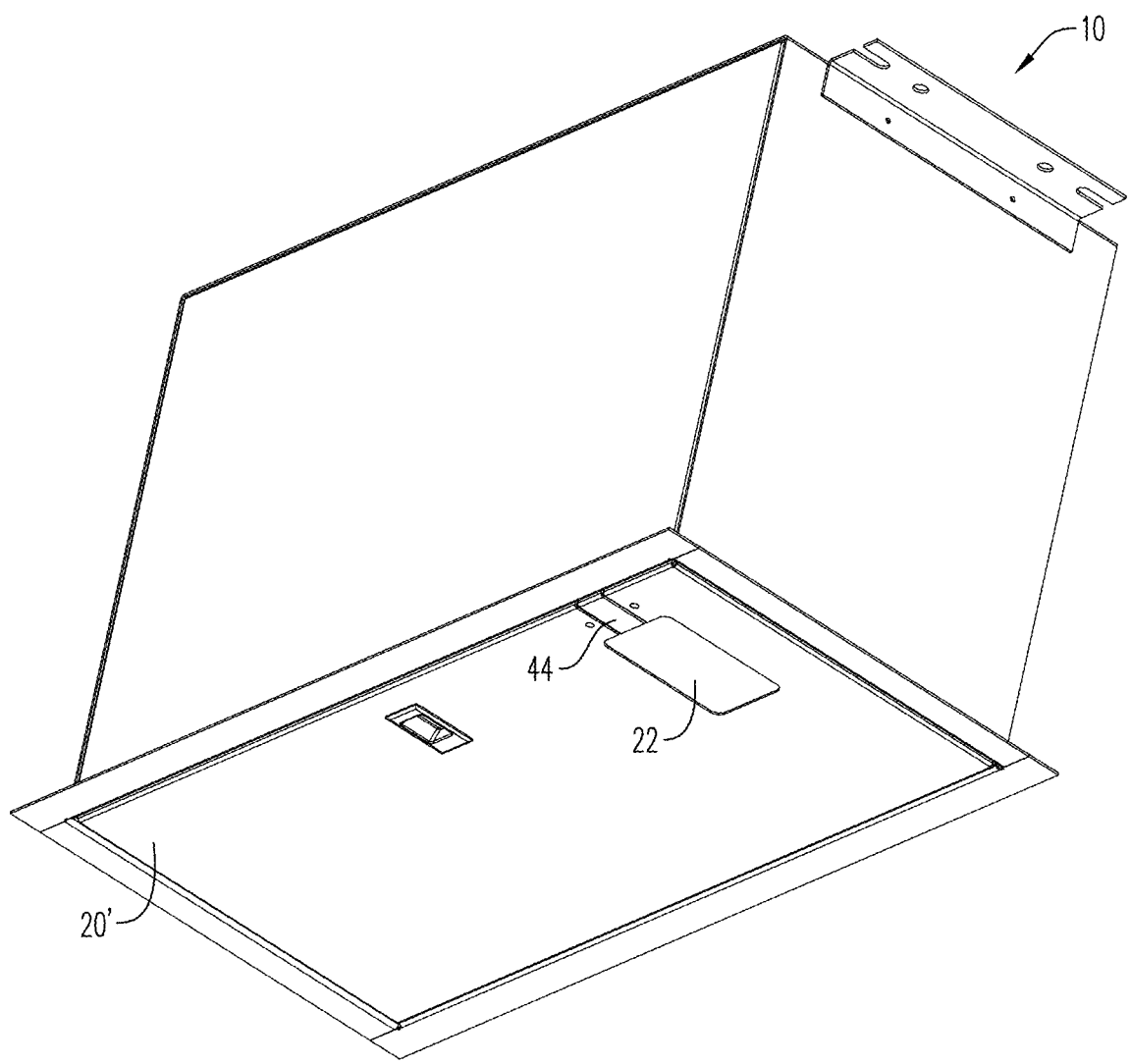
FIG. 13 is a perspective view of the assembly of FIG. 1 having another alternate embodiment of a door or closure according to the present disclosure.
Figure 14:
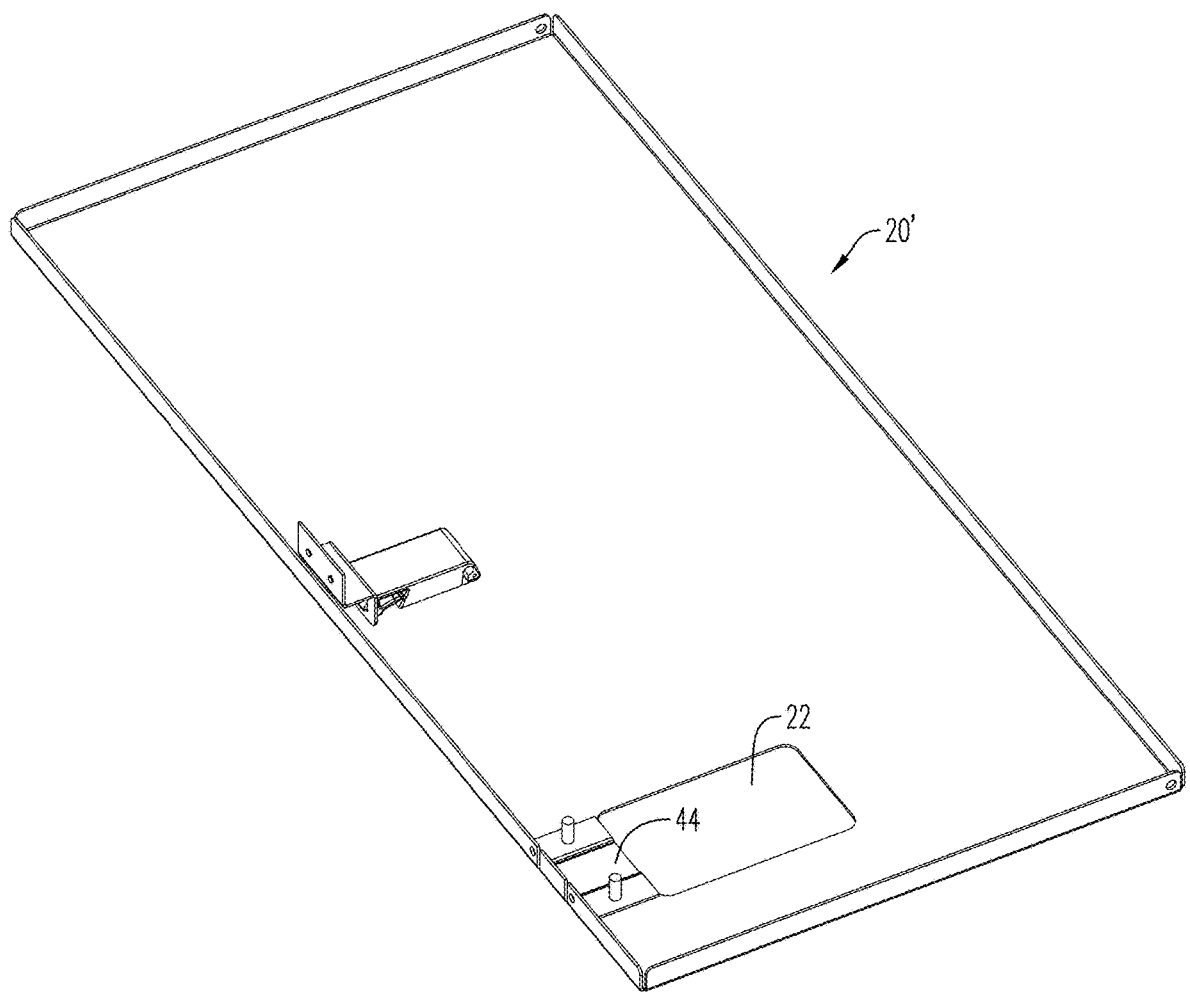
FIG. 14 is a top view of a door of the assembly of FIG. 13.
Figure 15:
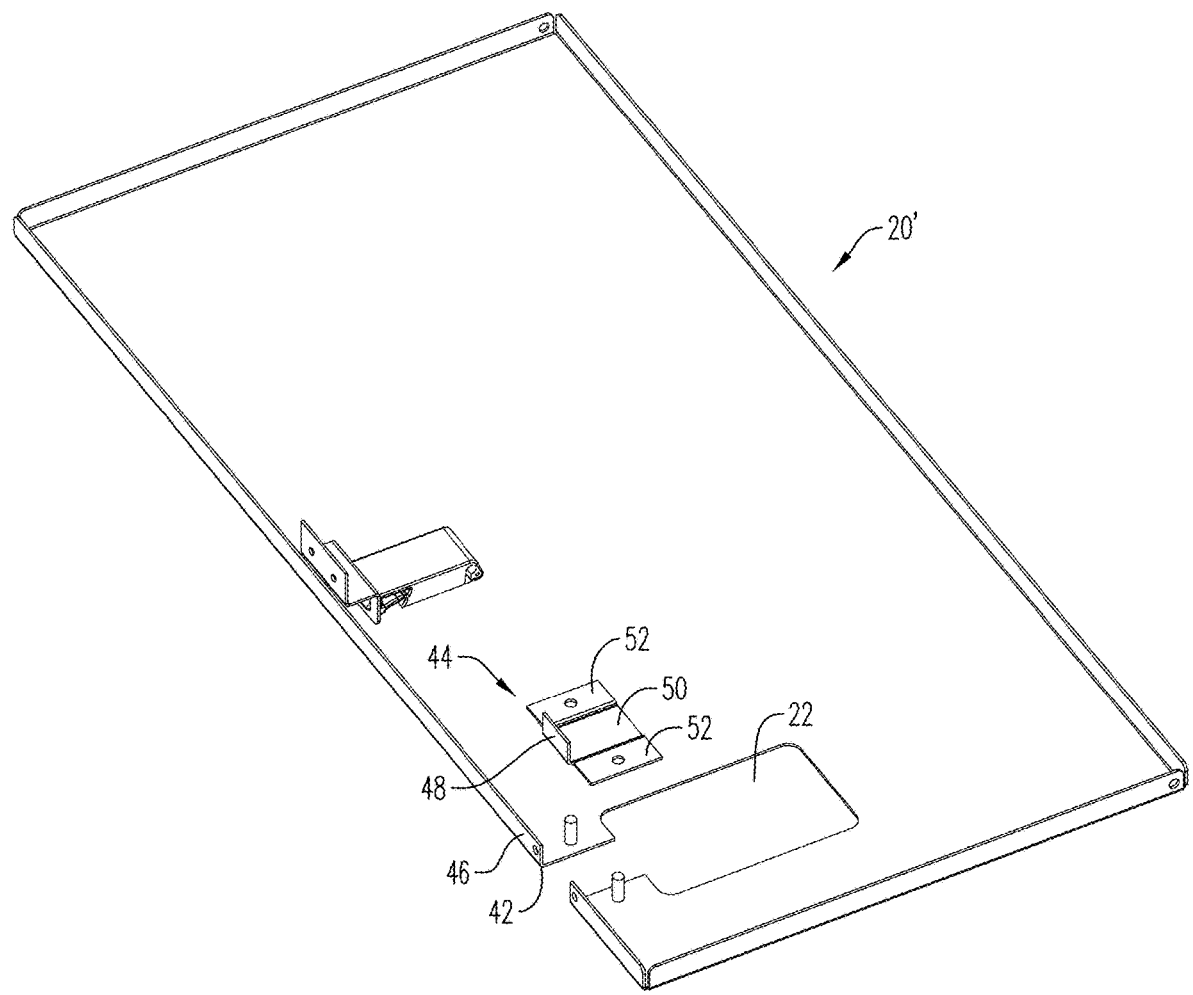
FIG. 15 is partially disassembled view of the door of FIG. 14.
Figure 16:
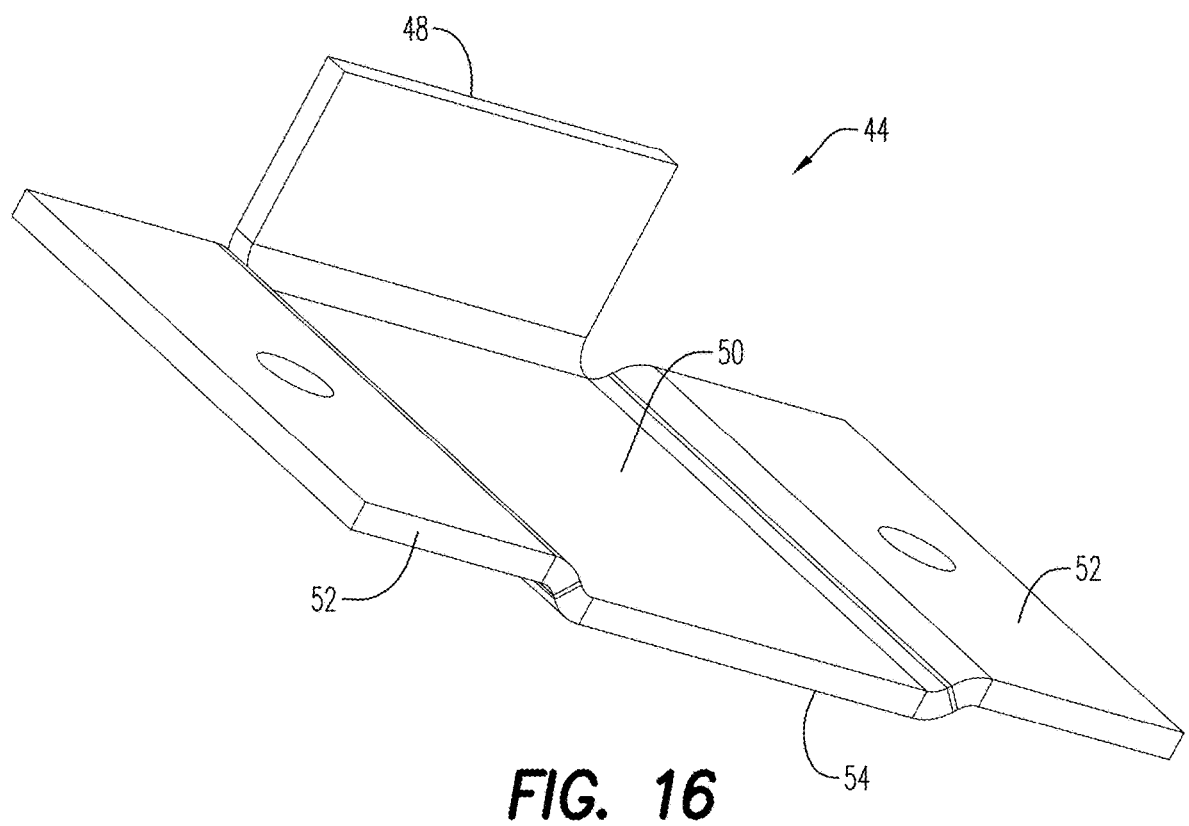
FIG. 16 is a perspective view of an edge cover of FIG. 13.

Of course, it is also contemplated by the present disclosure for opening 22 to have a low friction surface 24' directly thereon as illustrated in FIG. 13.

Assembly 10 advantageously allows reel 14 to be positioned above the finished ceiling, conceals the reel, yet maintains cord 16 accessible for use in the finished space.

Enclosure 12 includes one or more supports 26 (two shown) depending therefrom. Supports 26 are configured for securement to a support surface (not shown).

Figure 2B:
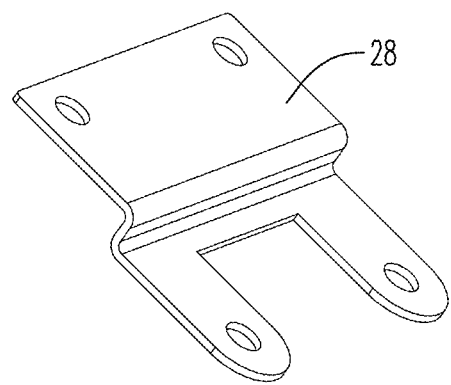
FIG. 2B illustrates an exemplary embodiment of the brackets shown in FIG. 2.
Figure 2B:
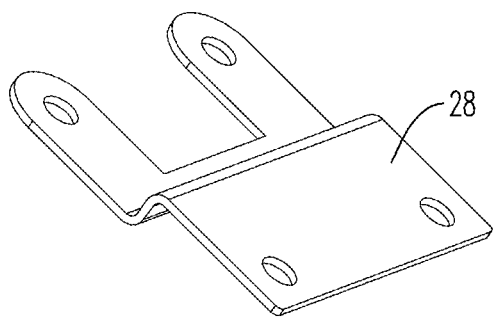
Figure 3B:
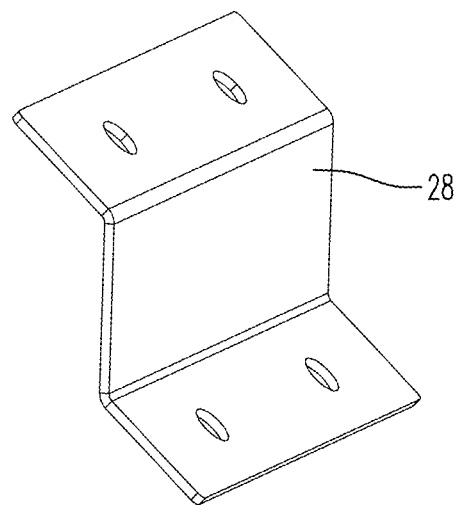
FIG. 3B illustrates an exemplary embodiment of the brackets shown in FIG. 3.
Figure 3B:
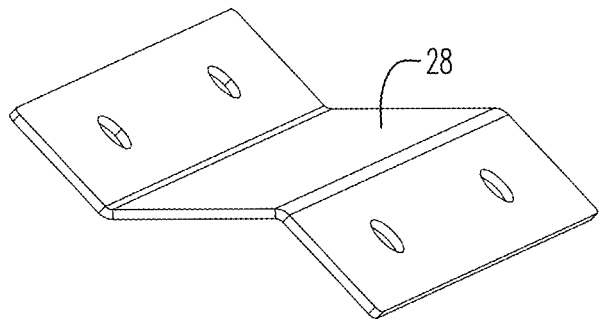
Figure 4:
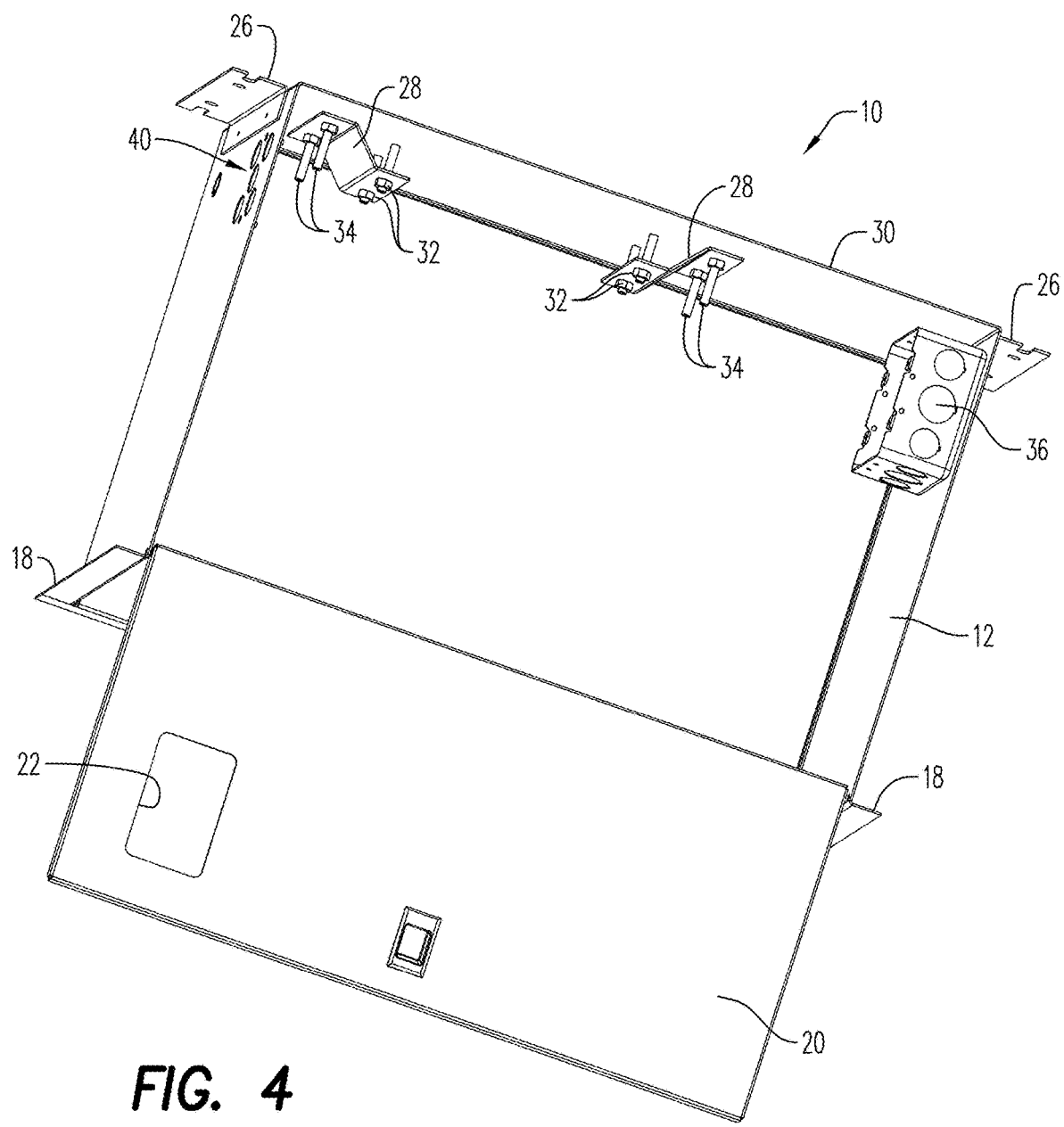
FIG. 4 illustrates the assembly of FIG. 3 with various components omitted.
Figure 5:
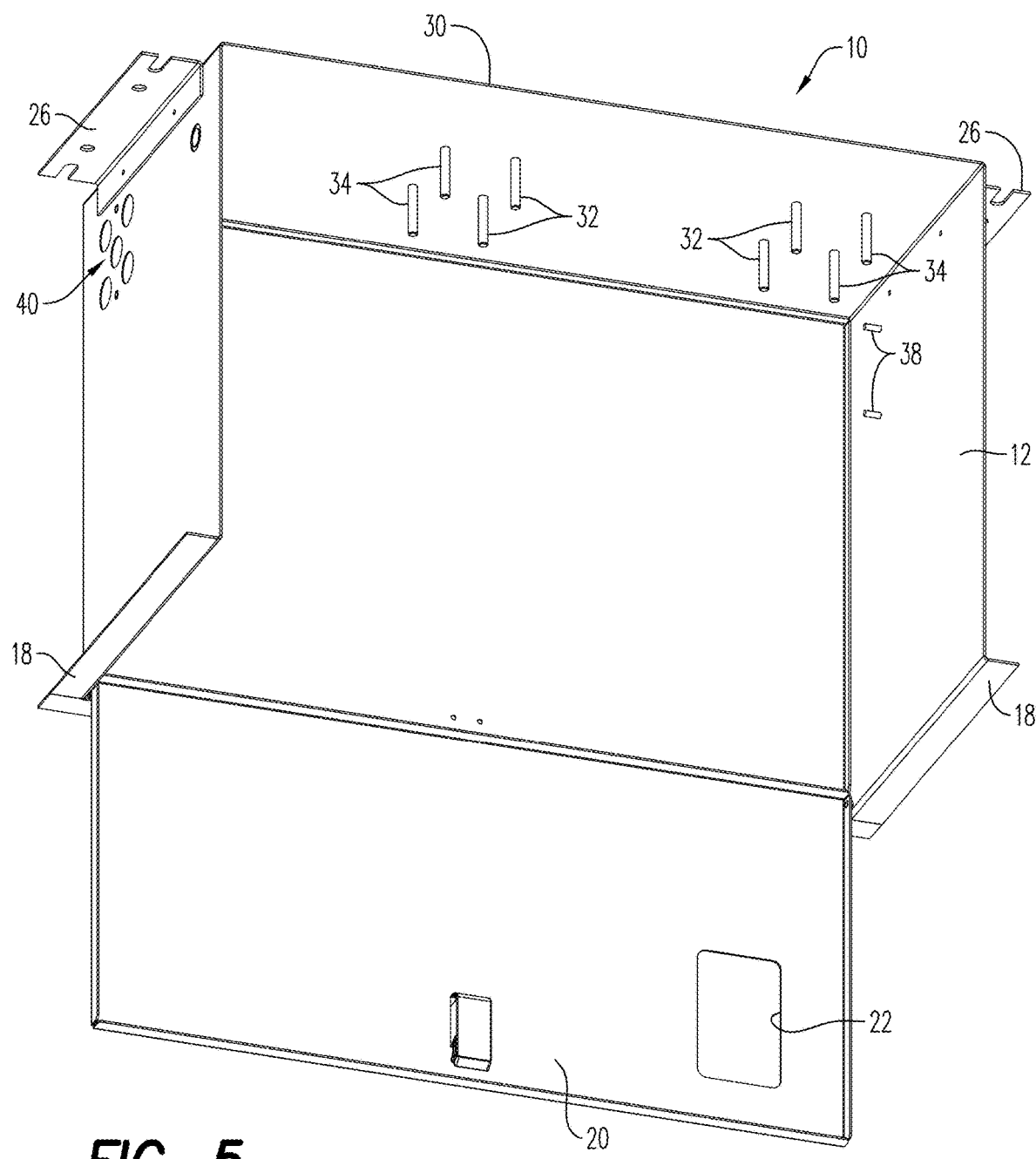
FIG. 5 illustrates the assembly of FIG. 3 with additional components omitted.
Figure 6:
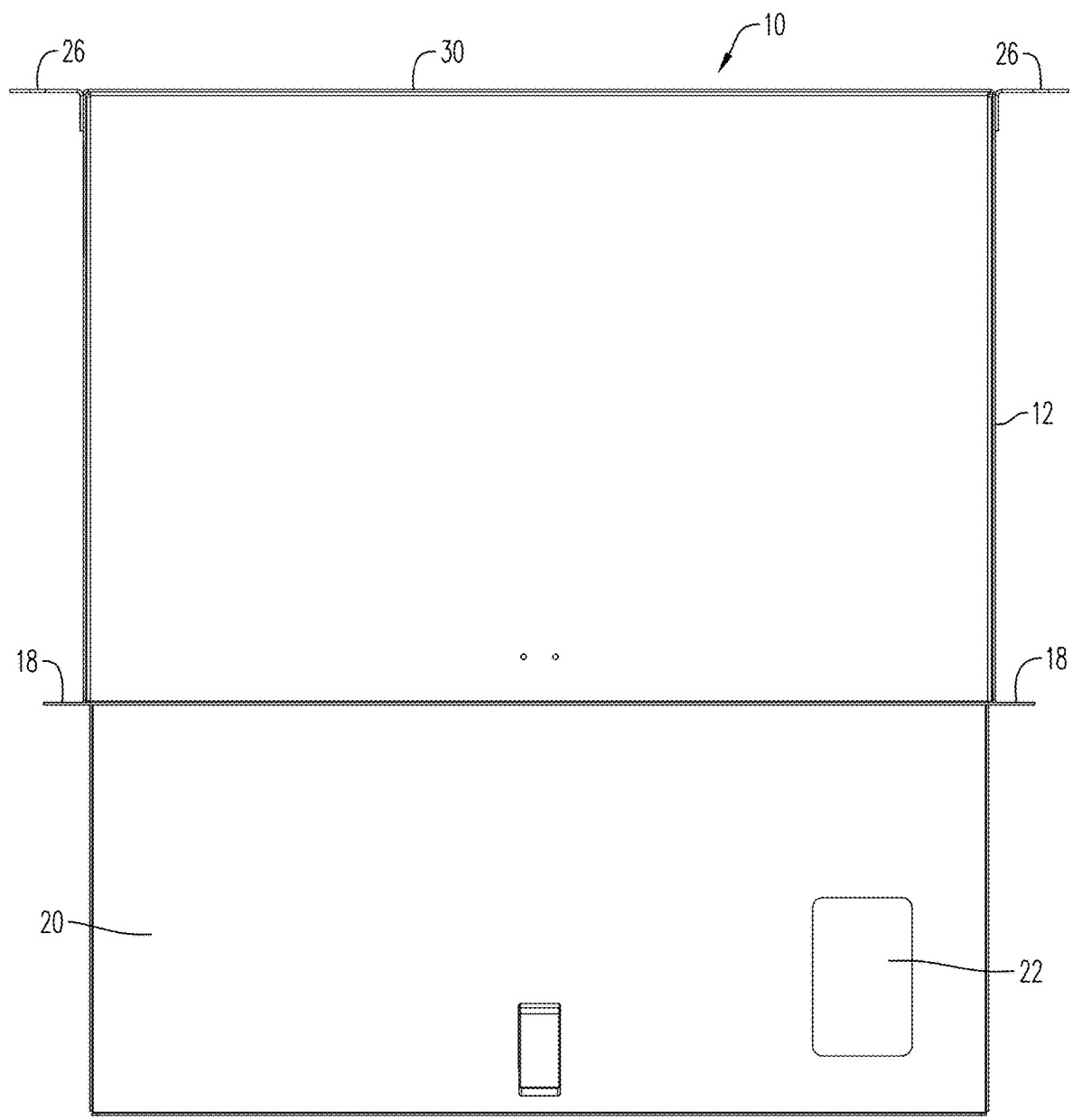
FIG. 6 is a first side view of the assembly of FIG. 4.
Figure 7:
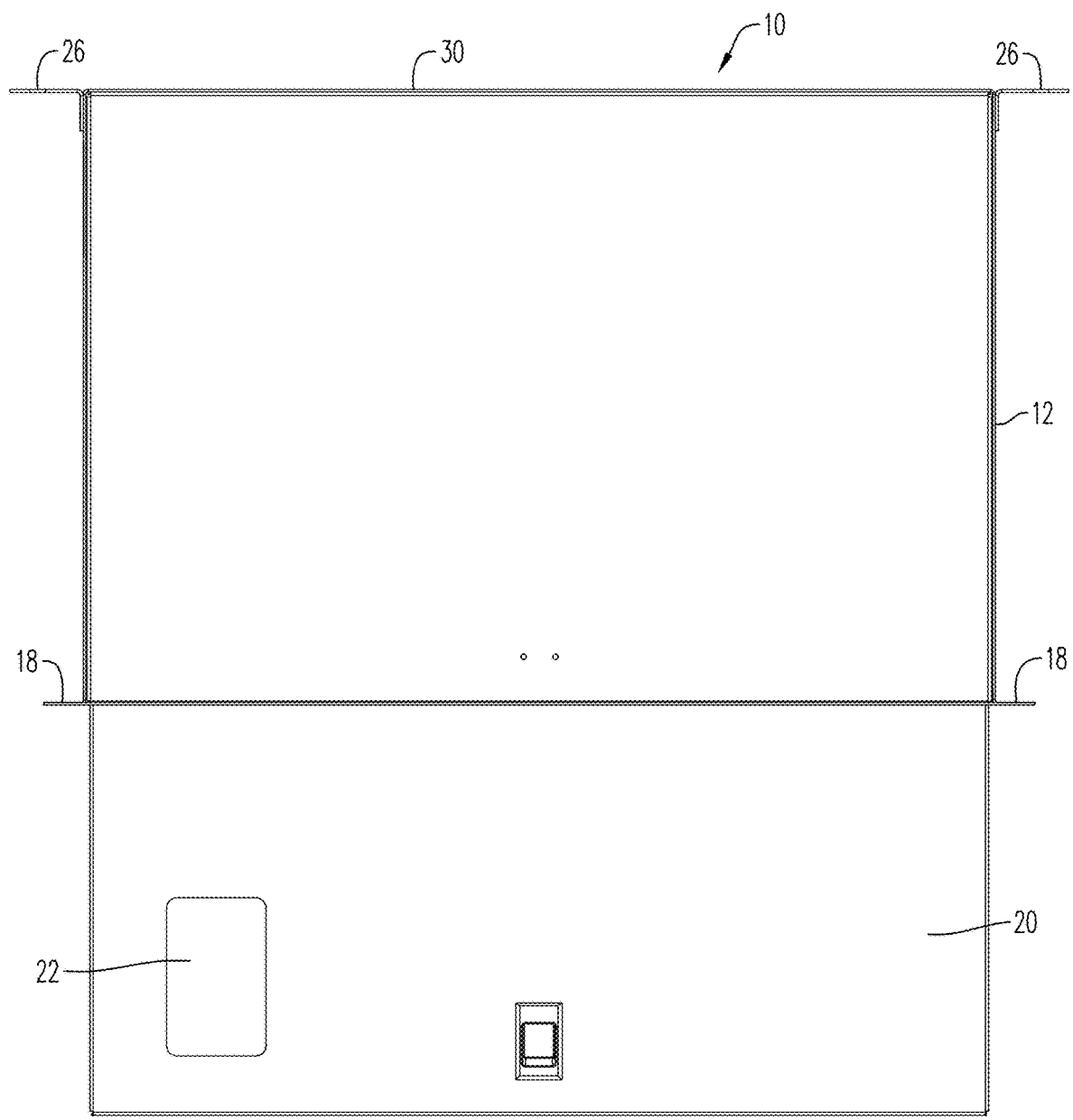
FIG. 7 is a second, opposite side view of the assembly of FIG. 4
Figure 8:
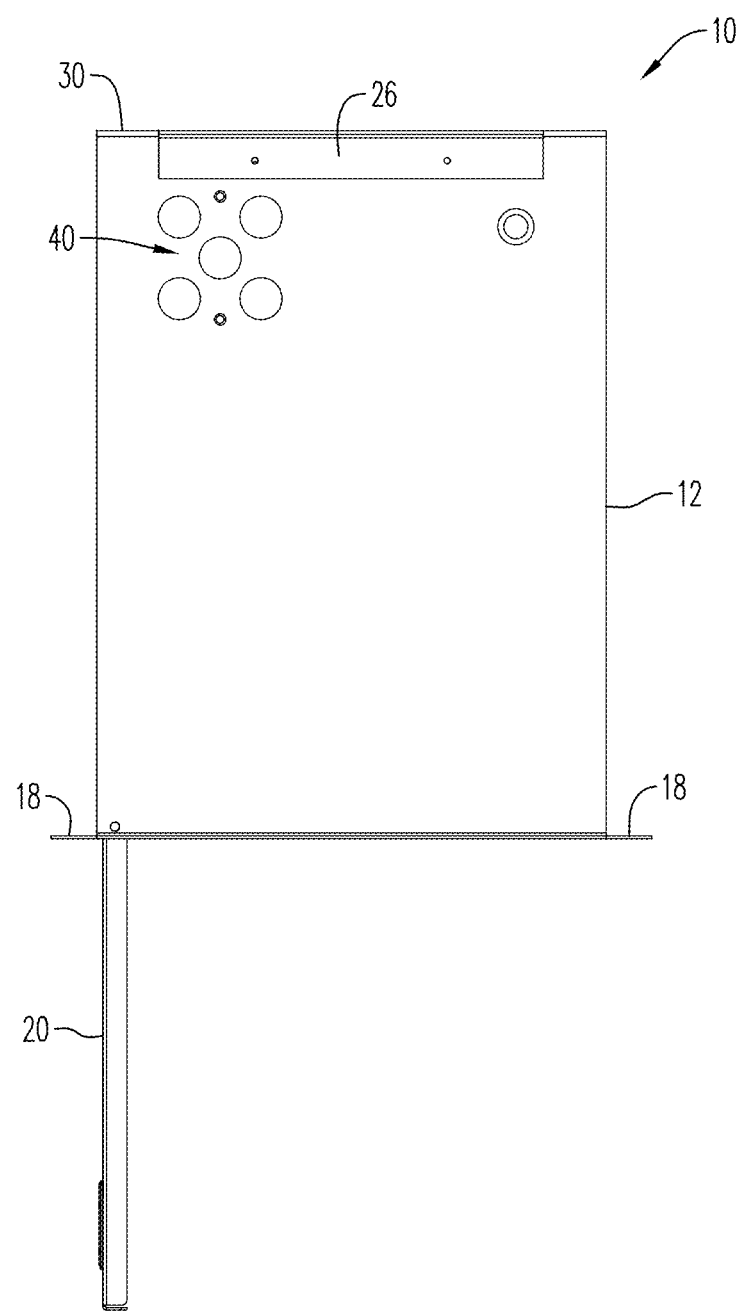
FIG. 8 is a first end view of the assembly of FIG. 4.
Figure 9:
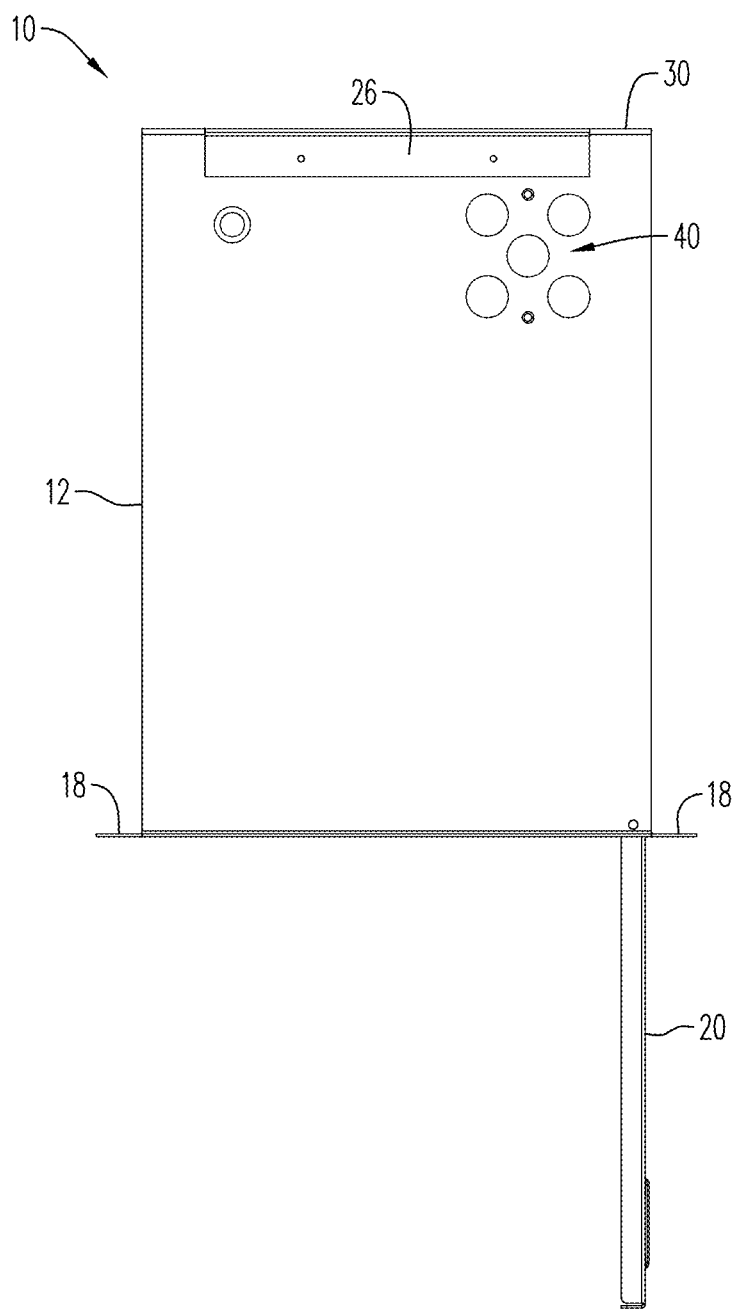
FIG. 9 is a second, opposite end view of the assembly of FIG. 4.
Figure 10:
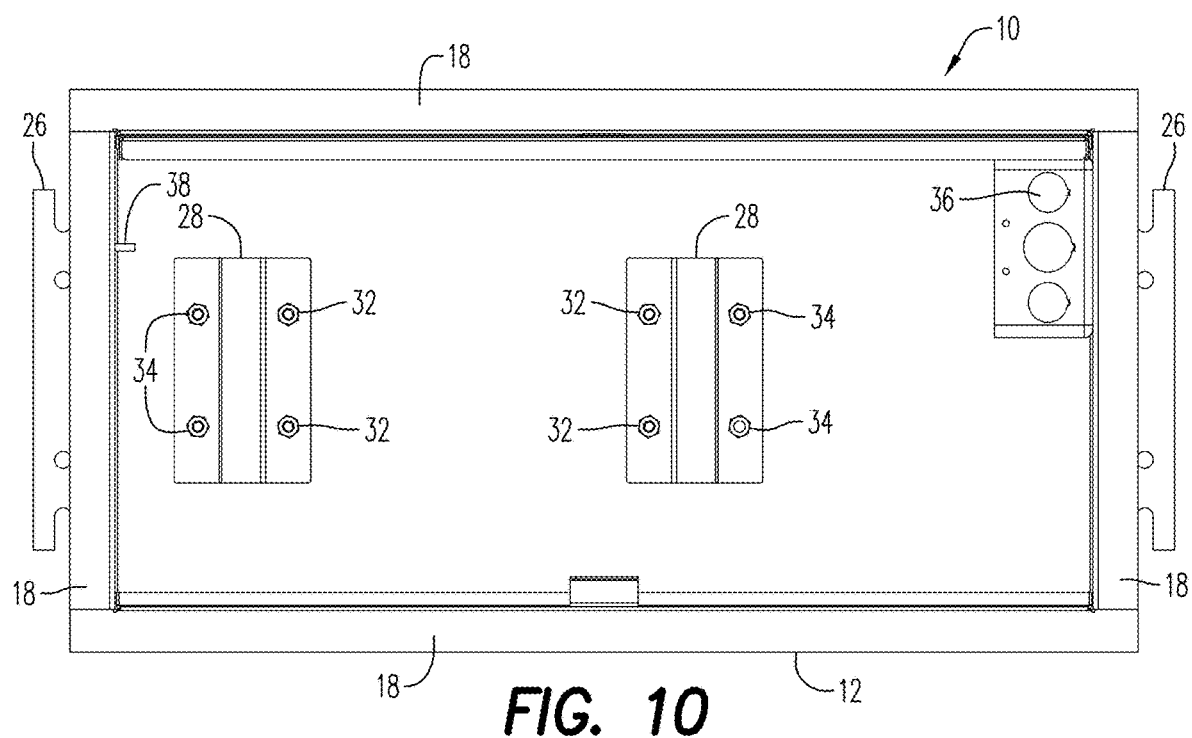
FIG. 10 is a bottom view of the assembly of FIG. 4.
Figure 11:
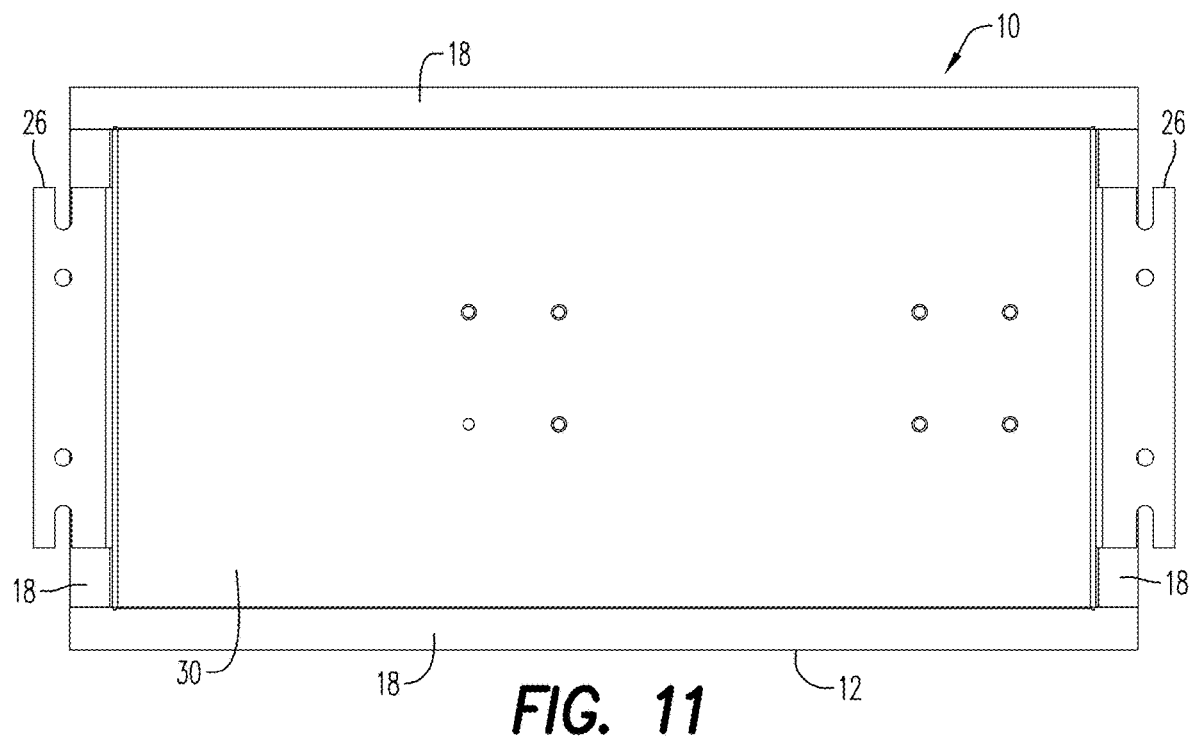
FIG. 11 is a top view of the assembly of FIG. 4.
Figure 12:
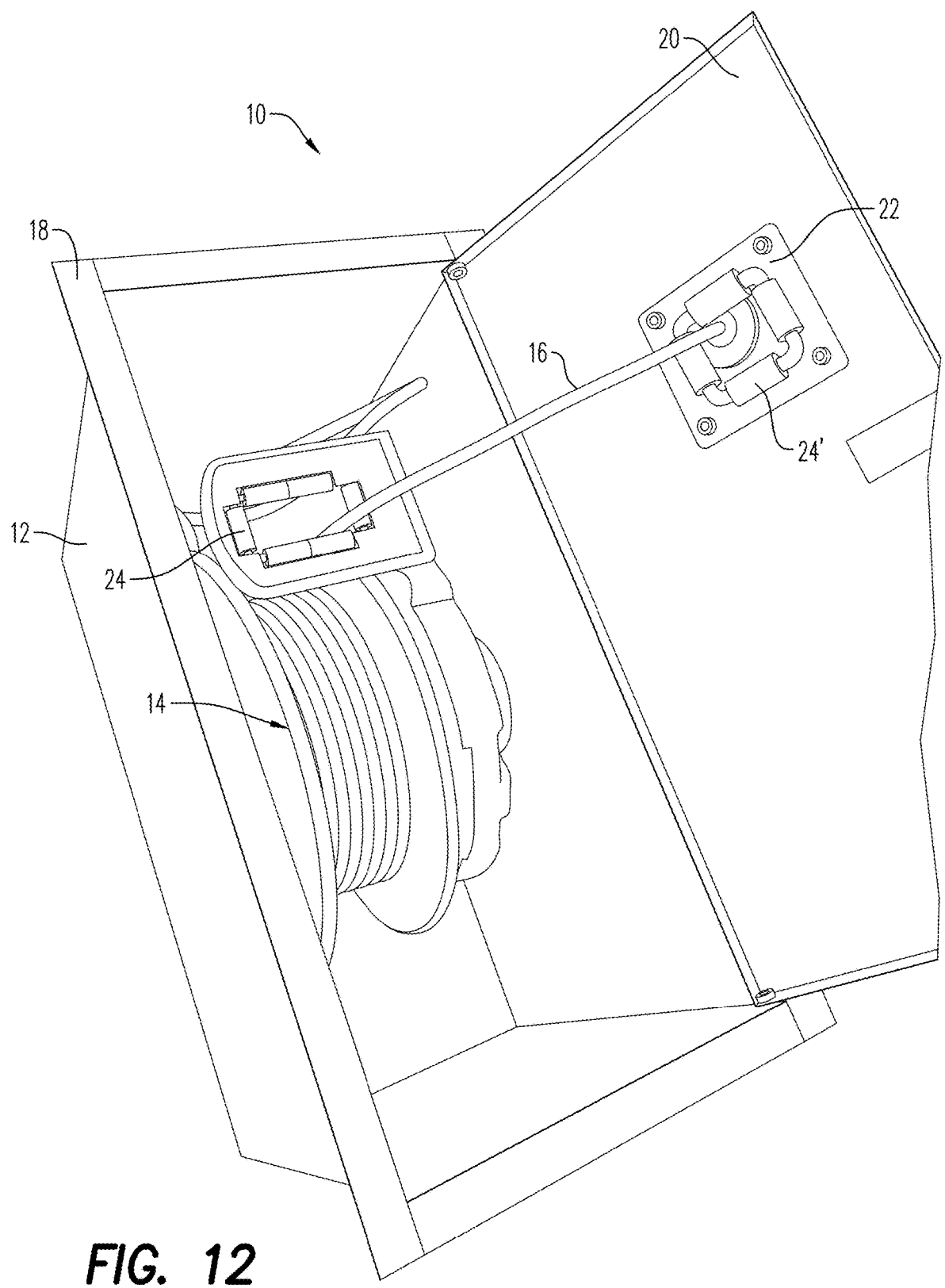
FIG. 12 is a perspective view of the assembly of FIG. 1 having an alternate embodiment of a door or closure according to the present disclosure.

Enclosure 12 can, in some embodiments, include one or more brackets 28 (two shown) that secure reel 14 to a wall 30 of the enclosure. In the illustrated embodiment, wall 30 is shown as an upper wall. Of course, it is contemplated by the present disclosure for brackets 28 to be positioned on any desired wall of enclosure. Exemplary embodiments of brackets 28 are shown in FIGS. 2B and 3B—where the brackets are illustrated having different shapes or configurations to support different regions of base plate 14-1.

In some embodiments, brackets 28 are configured to provide a primary connection 32 and a secondary connection 34 for securing reel 14 to enclosure 12.

Primary connection 32 can be one or more bolts (four shown) depending from enclosure 12. Here, primary connection 32 pass through a base plate 14-1 of reel 14. Thus, primary connection 32 is forms a direct bolted connection between enclosure 12 and reel 14 through brackets 28.

Secondary connection 34 can also be one or more bolts (four shown) depending from enclosure 12. Here, secondary connection 34 secure brackets 28 to enclosure 12 with the brackets supporting plate 36 of reel 14. Thus, secondary connection 34 is forms an indirect bolted connection between enclosure 12 and reel 14 via brackets 28.

It should be recognized that assembly 10 is illustrated by way of example as having bracket 28. Of course, it is contemplated by the present disclosure for bracket 28 to be omitted and for base plate 14-1 to be bolted directly to wall 30 using the bolts of primary connection 32.

Assembly 10 can include a supply device 36 for communication with cord 16 stored in cord reel 14. Supply device 36 is secured to enclosure by one or more connectors 38.

For example in embodiments where cord 16 is an electrical extension cord, supply device 36 can be a junction box sufficient to house one or more electrical outlets. Here, the outlet can be operatively connected to an electrical plug of reel 14 to provides power to cord 16 stored therein.

Of course, supply device 36 can be any supply device configured to supply cord 16 stored in reel 14. In the example where cord 16 in reel 14 is a computer communication cable, supply device 36 can be a junction box having a female RJ45 connector. In the example where cord 16 in reel 14 is a conduit for compressed air, supply device 36 can be a compressed air manifold.

Enclosure 12 can include one or more knockouts 40 that allow the feeding of power, compressed, air, water, or another resource through the wall of the enclosure to cord 16.

As discussed above, enclosure 12 seals the interior that houses reel 14 from the exterior that is within the plenum space. In some embodiments, enclosure 12 can provide the aforementioned sealing capability by ensuring that one or more of: the bolts forming primary connection 32 and/or secondary connection 34; connectors 38; and knockouts 40 do not provide openings through the walls of the enclosure.

Turning now to FIGS. 13-16, assembly 10 is shown with an alternate embodiment of door 20'. Here, door 20' is removable from the enclosure or is hinged to enclosure so that the enclosure can be opened with respect to the finished space or closed off from the finished space. Door 20' include opening 22 positioned and configured to cooperate with reel (not shown) so that cord (also not shown) protrudes or is at least accessible through the door.

As discussed above, opening 22 can be sized to prevent the cord from being cut or damaged by friction when extending and retracting from assembly 10. As also discussed above, opening 22 can include the low friction surface shown in FIG. 13.

Advantageously, door 20' includes opening 22 that passes through a door edge 42. In this manner, the cord can be passed into opening 22 through door edge 42 without having to remove any devices (e.g., plugs, outlets, etc.). In some embodiments, door 20' can further include an edge cover 44, removably attached at door edge 42. Edge cover 44 can selectively close opening 22 at edge 42 to maintain the cord in the opening.

Door 20' can include edge 42 that has an upturned portion 46 that provides structural rigidity to the door. In these embodiments, edge cover 44 can also include a corresponding upturned portion 48.

In some embodiments, edge cover 44 is configured to be secured to an inner surface of door 20' in a manner that ensures the outer surface of the door with edge cover installed is substantially planar. For example, edge cover 44 can include a central region 50 and one or more outer regions 52 (two shown). Outer regions 52 are configured to be secured to the inner surface of door 20'. Central region 50 is offset from outer regions 52 so that an outer surface 54 of the central region is substantially planar to the outer surface of door 20'.

It should also be noted that the terms "first", "second", "third", "upper", "lower", and the like may be used herein to modify various elements. These modifiers do not imply a spatial, sequential, or hierarchical order to the modified elements unless specifically stated.

While the present disclosure has been described with reference to one or more exemplary embodiments, it will be understood by those skilled in the art that various changes may be made and equivalents may be substituted for elements thereof without departing from the scope of the present disclosure. In addition, many modifications may be made to adapt a particular situation or material to the teachings of the disclosure without departing from the scope thereof. Therefore, it is intended that the present disclosure not be limited to the particular embodiment(s) disclosed as the best mode contemplated, but that the disclosure will include all embodiments falling within the scope of the appended claims.

What is claimed is:

1. A cord reel assembly, comprising:
a cord reel having a base plate; and
a plenum rated enclosure being open at a bottom edge, the bottom edge extending outward of the enclosure, the base plate being secured in the enclosure, wherein the enclosure, above the bottom edge, seals an area within the enclosure from an exterior of the enclosure in an airtight manner so that the enclosure above the bottom edge is positionable outside of a finished space with the cord reel accessible from the finished space.

2. The assembly of claim 1, further comprising a cord wound on the cord reel.

3. The assembly of claim 2, wherein the base plate is secured in the enclosure so that the cord of the cord reel extends through the bottom edge.

4. The assembly of claim 1, further comprising a door at the bottom edge to selectively close the enclosure.

5. The assembly of claim 4, further comprising a cord wound on the cord reel.

6. The assembly of claim 5, wherein the cord is selected from a group consisting of an electrical extension cable, a computer network communication cable, a compressed air hose, and a fluid hose.

7. The assembly of claim 5, wherein the door has an opening defined therethrough, and wherein the cord reel is secured in the enclosure so that the cord extends through the opening when the door closes the enclosure.

8. The assembly of claim 7, wherein the opening further comprises a friction reducing structure selected from a group consisting of rounded edges, coated edges, rollers, and any combinations thereof.

9. The assembly of claim 7, wherein the opening passes through a door edge.

10. The assembly of claim 9, further comprising an edge cover removably attached at the door edge to selectively close the opening at the door edge.

11. The assembly of claim 10, wherein the door edge and the edge cover have upturned portions.

12. The assembly of claim 10, wherein the edge cover secured to an inner surface of the door in a manner that ensures an outer surface of the door substantially planar.

13. The assembly of claim 1, wherein the cord reel further comprises a low friction surface at the opening.

14. The assembly of claim 13, wherein the low friction surface is one or more rollers.

15. The assembly of claim 1, wherein the enclosure further comprises a supply device secured therein.

16. The assembly of claim 15, wherein the supply device is a junction box.

17. The assembly of claim 1, wherein the enclosure further comprises one or more supports depending therefrom, the one or more supports being configured for securement of the enclosure to a support surface.

18. The assembly of claim 1, further comprising one or more brackets securing the cord reel to a wall of the enclosure.

19. The assembly of claim 18, wherein the one or more brackets are configured to provide a primary connection and a secondary connection for securing the cord reel to the wall.

20. The assembly of claim 19, wherein the primary connection comprises one or more first bolts depending from the wall, the one or more first bolts pass through the base plate to form a direct bolted connection between the wall and the cord reel through the one or more brackets.

21. The assembly of claim 20, wherein the secondary connection comprises one or more second bolts depending from the wall, the one or more second bolts secure the one or more brackets to the enclosure with the one or more brackets supporting the base plate to form an indirect bolted connection between the wall and the cord reel via the one or more brackets.

22. The assembly of claim 19, wherein the secondary connection comprises one or more second bolts depending from the wall, the one or more second bolts secure the one or more brackets to the enclosure with the one or more brackets supporting the base plate to form an indirect bolted connection between the wall and the cord reel via the one or more brackets.

23. A cord reel assembly, comprising:

a cord reel having a base plate;

a cord wound on the cord reel;

a plenum rated enclosure that is open at a bottom edge, the bottom edge extending outward of the enclosure, wherein the enclosure, above the bottom edge, seals an area within the enclosure from an exterior of the enclosure in an airtight manner so that the enclosure is positionable outside of a finished space with the bottom edge in the finished space;

a door at the bottom edge to selectively open and close the enclosure, wherein the door has an opening defined therethrough; and one or more brackets securing the base plate of the cord reel to a wall of the enclosure so that the cord reel is housed in the enclosure with the cord extending through the opening into the finished space when the door closes the enclosure.

24. A cord reel assembly, comprising:

a cord reel having a base plate;

a plenum rated enclosure being open at a bottom edge, the base plate being secured in the enclosure, wherein the enclosure, above the bottom edge, seals an area within the enclosure from an exterior of the enclosure in an airtight manner;

a door at the bottom edge to selectively close the enclosure, the door having an opening passing through a door edge;

a cord wound on the cord reel, the cord reel being secured in the enclosure so that the cord extends through the opening when the door closes the enclosure; and an edge cover removably attached at the door edge to selectively close the opening at the door edge.

* * * * *